Figure 4:
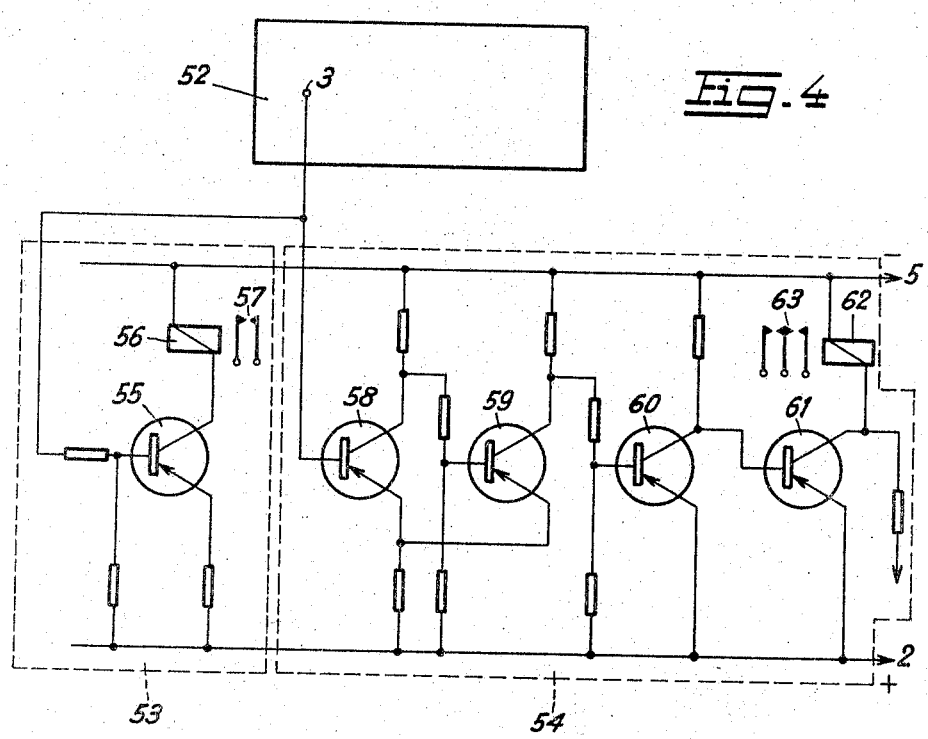

May 9, 1967 G. SCHICK 3,319,116
APPARATUS FOR THE AUTOMATIC CONTROL OF THE HEADLIGHTS OF A VEHICLE
Filed June 22, 1964 3 Sheets-Sheet 1
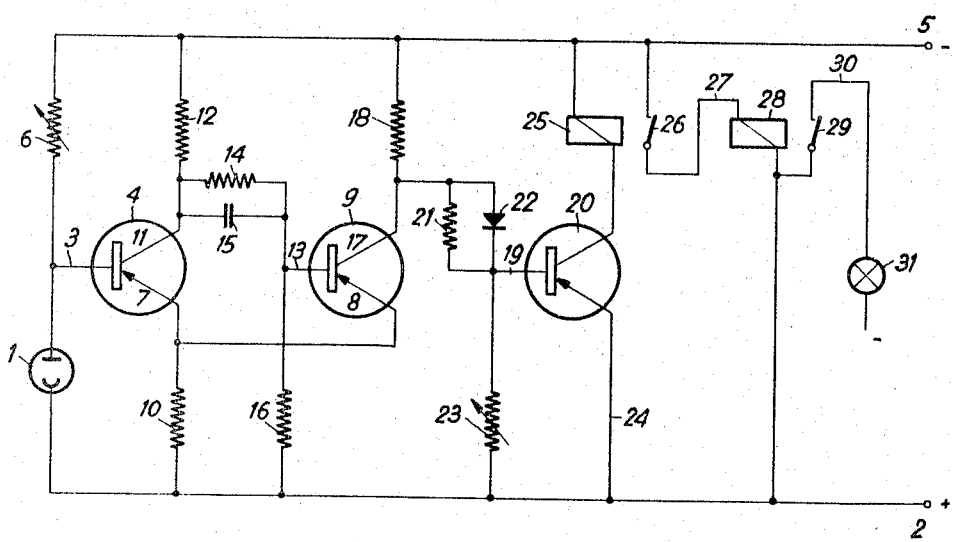
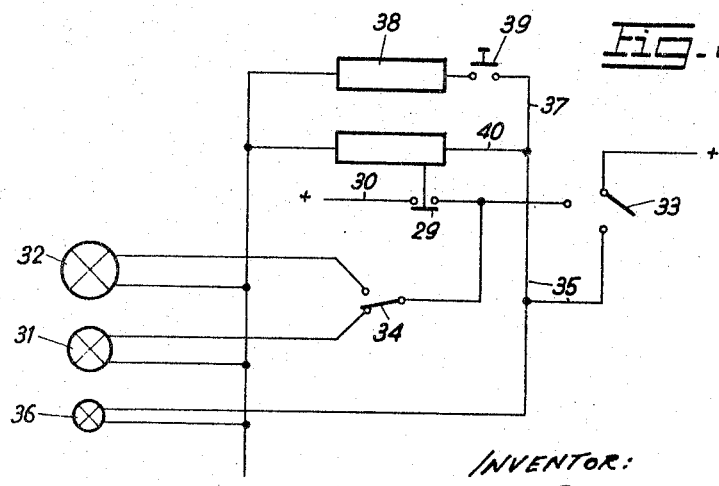
INVENTOR:
GEORGES SCHICK
By Raymond Wootton
ATTORNEY

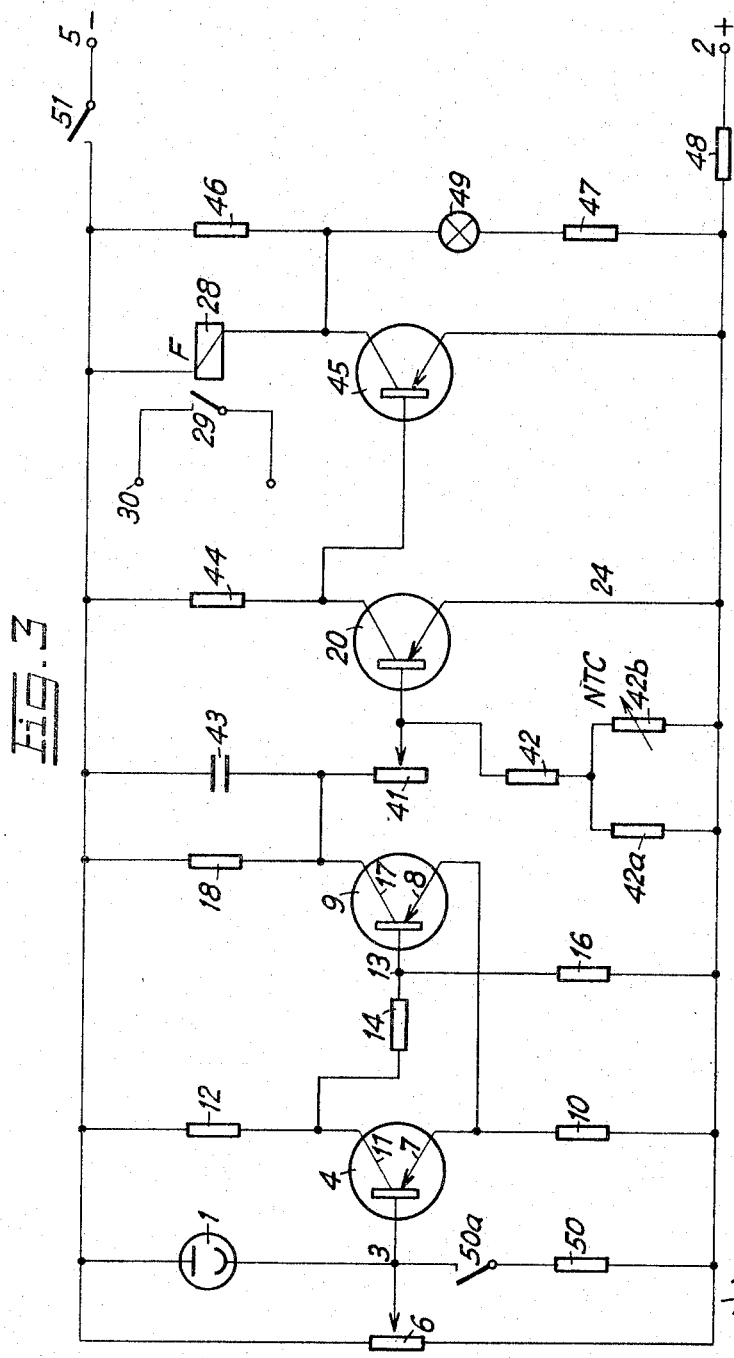

INVENTOR:
GEORGES SCHICK 3,319,116
APPARATUS FOR THE AUTOMATIC CONTROL OF
THE HEADLIGHTS OF A VEHICLE
Georges Schick, Sous Mont 5, Prilly, Switzerland
Filed June 22, 1964, Ser. No. 376,897
Claims priority, application Switzerland, June 26, 1963,
7,888/63
2 Claims. (Cl. 315—83)

Automatic devices provided with a photosensitive member are already known, by means of which the main driving headlights of a vehicle are switched off and the secondary headlights are switched on as a result of the effect of the light rays emitted by the headlamps of an oncoming vehicle. Generally speaking, the photsensitive member consists of a photoelectric cell, the output pulses of which are amplified so as to actuate a relay.

The term "secondary headlights" when used in this specification and claims includes lights which cause less inconvenience to other road users than would main headlights by for example having some anti-dazzle quality, or a special directivity of beam. The regulations affecting traffic in built-up areas at present require that the drivers should switch off the secondary headlights and leave only the sidelights or parking lights in operation when the road lighting is sufficient. However, devices of the aforesaid type which actuate the driving headlights are so arranged as to operate under the effect of a light beam which impinges directly upon the photosensitive member, and of which the power is much greater than that of the light diffused by normal road lighting.

The principal object of the present invention is to provide an apparatus which automatically switches on and off the secondary headlights of a vehicle under the influence of the variations of the artificial lighting of a road.

Another object of the invention is to provide an apparatus which has a sufficient operating time delay to avoid switching on and off of the secondary headlights when the average lighting of the road is insufficient to permit driving with sidelights, but temporarily rises above the operating threshold, for example when the vehicle passes under a streetlamp or passes an oncoming evhicle.

Finally, another object of the invention is to provide a combined apparatus which automatically performs all the functions of controlling the various headlights, i.e. the automatic switching-on of the sidelights at nightfall, the switching on and off of the secondary headlights in accordance with the artificial road lighting, the switching on of the main driving headlights when the vehicle is travelling outside a built-up area, and in this case the automatic change from the main driving headlights to the secondary headlights when a vehicle approaches in the opposite direction.

According to the present invention there is provided apparatus for the automatic control of the headlights of a vehicle having main headlights and secondary headlights, characterised in that it comprises a photosensitive resistor connected to the input of an amplifying circuit and a relay connected to the output of the said circuit and arranged so as to bring the secondary headlights of the vehicle into operation when the intensity of the light to which the photosensitive resistor is exposed is below a certain threshold and to take them out of operation when the intensity of the light is above the said threshold, the amplifying circuit and the photosensitive resistor being so adjusted that the said threshold corresponds to the average intensity of artificial road lighting.

Figure 5:
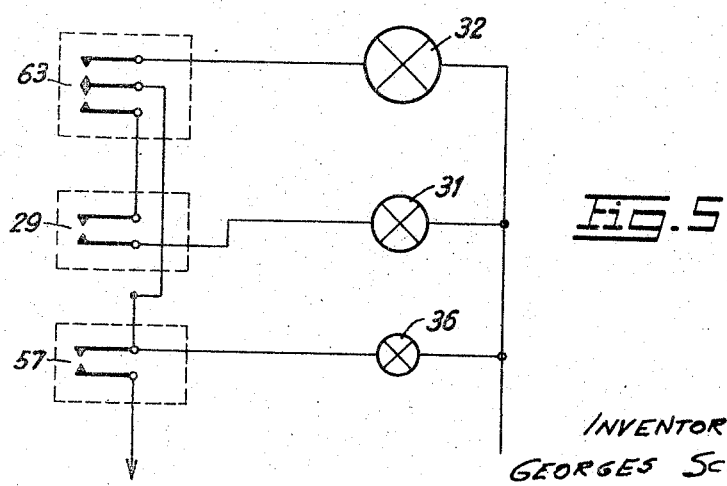

Embodiments of the present invention will now be described by way of example with reference to the accompanying drawings in which FIGURE 1 is a diagram of the circuit of a first apparatus, FIGURE 2 is a diagram illustrating the way in which the said apparatus is connected into the lighting circuits of a vehicle, FIGURE 3 is a diagram of the circuit of a second apparatus, FIGURE 4 is a diagram of the circuit of a third apparatus, and FIGURE 5 is a diagram illustrating the way in which components of the circuit shown in FIG. 4 are connected into the lighting circuits of a vehicle.

The essential part of the apparatus illustrated in FIGURE 1 is a photosensitive resistor 1 which is arranged to be exposed to the ambient light and of which the ohmic resistance depends upon the intensity of this lighting. The said photosensitive member has a resistance whose value approaches infinity when the lighting is absolutely zero and whose value can fall to an order of magnitude of 20,000 ohms when it is exposed to daylight.

The resistor 1 is connected between the positive pole 2 of a direct-current source and the base 3 of a first transistor 4, the said base being connected on the other hand to the negative pole 5 of the current source by a variable resistor 6. The emitter 7 of the transistor 4 and the emitter 8 of a second transistor 9 are connected in parallel and are connected to the positive pole 2 by a resistor 10. The collector 11 of the transistor 4 is connected on the one hand to the negative pole 5 by a resistor 12, and on the other hand to the base 13 of the transistor 9 by a resistor 14 shunted by a capacitor 15.

The base 13 of the transistor 9 is in addition connected to the positive pole 2 by a resistor 16.

The collector 17 of the transistor 9 is also connected to the negative pole 5 by a resistor 18 and to the base 19 of a third transistor 20 by a resistor 21 the latter being shunted by a Zener diode 22. The base 19 is also connected via a variable resistor 23 to the positive pole 2. Variations of the potential on the base 19 of the transistor 20 affect the flow of current through a circuit 24 extending from the positive pole 2 to the negative pole 5 through the emitter-collector path of the transistor 20 and the coil of a relay 25. The relay 25 has a contact 26 connected in a circuit 27 in a series with the coil of a second relay 28. The said second relay has a contact 29 capable of passing a current of the order of 15 to 20 amperes and connected in a circuit 30 in series with the secondary headlights of a vehicle to the negative pole of a source of potential.

As will be seen in FIGURE 2, the main headlights 32 and the secondary headlights 31 are fed through the circuits extending from the positive pole of a battery to the negative pole through a three-position main switch 33 and a footswitch 34. The circuit 30 may be connected via contact 29 to the supply line connected between the switch 33 and the switch 34. The switch 33 also has a contact for the operation of the sidelights 36, and this contact is connected to a circuit 35 which supplies both the sidelights 36 and the dashboard 38 of the vehicle via a circuit 37 with power from the positive pole of the battery. A switch 39 is provided for switching the lighting of the dashboard on and off as desired.

The apparatus described comprises a plug 40 which is connected to the circuit 37, so that the apparatus is placed under voltage as soon as the switch 33 has been brought to the position for operating the sidelights.

The whole apparatus described can be mounted in a casing of small dimensions which may be mounted, for example, on the dashboard or facia board, or behind the driving mirror, so that the sensitive zone of the resistor 1 is exposed to the ambient light. The only connections to be made consist in connecting the plug 40 to the circuit 37 and the line 30 to the positive pole of the battery and to the headlamp supply circuit.

When the sidelights are in operation, the device is connected to the battery voltage of 6 volts. When the intensity of the light to which the resistor 1 is subjected varies, the current flowing through this resistor and through the resistor 6 also varies and the voltage on the base 3 changes. The whole arrangement is so adjusted that if there is sufficient light to permit driving with the sidelights, the voltage of the base 3 is sufficiently high to render the transistor non-conductive. The transistor 20 is then also non-conductive and the relays 25 and 28 are de-energised.

If the vehicle travels into a zone in which the intensity of the lighting is lower, the resistance of the member 1 increases and the voltage of the base 3 decreases. A variation of this voltage by about 2% is sufficient to render the transistor 4 conductive, which results in a lowering of the voltage of the emitters 7 and 8, but on the other hand in an increase in the voltage of the collector 11 and of the base 13. The triggering of the transistor 4 then results in that of the transistors 9 and 20, so that the current flowing through the circuit 24 energizes the relay 25. The latter may be designed to be actuated by a relatively low current, while its contact 26 controls the coil of the relay 28 which, in turn, has a contact adapted to control the current for the operation of the headlights.

It is thus possible by means of the described apparatus, with simple means of small dimensions and low cost, to detect an effect as small as a variation in the intensity of artificial lighting and to amplify this effect sufficiently to be able to control a circuit supplying the headlamps of a vehicle.

FIGURE 3 is a basic circuit diagram of a second constructional form of the described apparatus. This second constructional form differs from the first only in a few details which are hereinafter described. The same references are use for the components of the circuit which are similar.

The photosensitive member 1 consists of a cadmium sulphide cell, of which the resistance is lower than 170,000 ohms when it is illuminated, but increases to about 200,000 ohms when it is brought into a dark medium. This cell is connected between the positive pole 5 and the base 3 of the transistor 4. The adjustable resistor 6 is directly connected between the positive and negative poles 2 and 5 respectively of the current source. Its slider is connected to the base 3.

The capacitor 15 is omitted. On the other hand, the resistor 21 and the Zener diode 22 are replaced by a capacitor 43 of very high capacitance, which is connected in parallel with the resistor 18, and by a variable resistor 41 for adjusting the discharge time of the capacitor 43. The latter becomes immediately charged when the transistor 9 is rendered conductive owing to an increase in the voltage of the collector 17. When this transistor becomes non-conductive, the capacitor 43 discharges in an adjustable time which is normally 8 seconds. The triggering of the transistor 20 and the de-energisation of the relay 28 are then delayed, i.e. the change from the secondary headlights to sidelights takes place with some time delay starting from the instant when the cell 1 undergoes the influence of a relatively strong light. It is possible with this arrangement to avoid the change from secondary headlights to sidelights under the effect of, for example, the headlights of an oncoming vehicle or passage under an isolated lamp. On the other hand, since the charge of the capacitor 43 is instantaneous, there is no delay in the operation of the relay 28, that is to say, the secondary headlights are immediately switched on when the cell 1 is situated in a dark area.

The variable resistor 23 is replaced by a set of resistors 42, 42a, 42b, of which the third one is a resistor having a negative temperature coefficient, which compensates for the effect of the variations of the ambient temperature. The arrangement is thus adapted to operate without variation between —20° and +40° C.

The relay 25 is replaced in the second constructional form by a transistor 45, of which the collector is connected to the negative pole 5 through the coil of the relay 28 and the emitter to the positive pole 2. The base of the transistor 45 is directly connected to the collector of the transistor 20, and, through a resistor 44, to the negative pole 5. It will be seen that the potential of the base of the transistor 45 varies substantially between the voltage of the positive pole 2 and 0, depending upon whether the transistor 20 is conductive or non-conductive.

Connected in parallel with the coil of the relay 28 is a resistor 46. A bulb 49 and a resistor 47 are connected in series between the point of connection of the resistor 46 and of the collector of the transistor 45, and the positive pole 2. The bulb 49 constitutes a pilot lamp constantly indicating the operating condition of the head lights. This lamp is extinguished when the transistor 45 is conductive, because the two terminals of this bulb are then substantially at the same potential. The current flowing through the transistor 45 is divided between the resistor 46 and the coil 28, which is energized and closes the contact 29. The secondary headlights are then in operation. On the other hand, when the transistor 45 is rendered non-conductive, the coil 28 is de-energised and only the sidelights are lit. The pilot lamp is then illuminated.

The described apparatus further comprises a resistor 48 which is inserted in the supply line leading to the positive pole. This resistor has the effect of improving the triggering of the various transistors 4, 9, 20 and 45 as a result of the variation of the light impinging upon the cell 1. As has been mentioned in the foregoing, the transistor 45 is rendered non-conductive when the cell 1 receives a relatively strong illumination. In this situation, the transistor 20 is rendered conductive, the transistor 9 is rendered non-conductive and the transistor 4 is rendered conductive, because the resistance of the cell 1 is then relatively low and the potential of the base 3 is at its lower value. The current consumption of the whole arrangement is then very low and the voltage at the output of the resistor 44, i.e. at the emitters of the transistors 20 and 45, is then substantially equal to the supply voltage. On the other hand, when the transistor 45 is rendered conductive under the effect of a decrease of the potential transistor and energises the relay 28. This results in a voltage drop at the output of the resistor 48, which has the effect of accelerating the charging of the capacitor 43 and favours the non-conduction of the transistor 20.

It will be apparent from the foregoing particulars that each of the transistors 9, 20 and 45 triggers in the opposite direction to the preceding one at each variation of the light impinging upon the cell 1. The transistor 4 is conductive under normal conditions, i.e. when the light impinging upon the cell 1 is sufficient to permit driving with sidelights. It is rendered non-conductive as soon as the light impinging upon the cell 1 falls below a certain threshold. It will also be observed that a resistor 50 and a switch 50a are connected in series between the base 3 and the positive pole 2. The placing in circuit of the resistor 50 permits of modifying the triggering threshold of the transistors, i.e. of setting the secondary headlights in operation earlier than when the switch 50a is open.

Finally, the apparatus comprises a starting switch 51. It is obvious that the switches 51 and 50a may be combined to form a single multi-position switch, or, for example, a pushbutton switch.

In a further construction form, the described apparatus may operate entirely automatically and control not only the switching on and off of the secondary headlights according to the intensity of the ambient lighting, but also the switching on of the sidelights and of the main headlighs according to requirements.

FIGURES 4 and 5 illustrate such a constructional form.

The light-sensitive member is again a cell of a type previously referred to as the cell 1. The apparatus comprises a first assembly 52 which is identical to that illustrated in FIGURE 3 and which will consequently not be described in greater detail. This assembly controls the contact 29, which is connected into the circuit of the secondary headlights 31 shown in FIGURE 5. Two other assemblies 53 and 54 are provided. The assembly 53 consists of a transistor 55, of which the collector is in series with a relay coil 56 controlling a contact 57. Various resistors are provided to maintain the terminals of the transistor at the desired voltage. As will be seen in FIGURE 4, the base of the transistor 55 is connected to the point 3 of the assembly 52. The contact 57 controls the bulbs 36 of the parking lights or sidelights.

The assembly 54 comprises four transistors 58, 59, 60 and 61 which are connected in stages in the same way as the transistors 4, 9, 20 and 45. Resistors control the voltage of the various terminals of the various transistors. It will be observed that this assembly has no time limit capacitor. The base of the first transistor 58 is connected to the point 3 of the assembly 52. The transistor 61 controls a coil 62, of which the contacts constitute a change-over switch 63. This switch remains normally in a position in which the secondary headlights 31 are in operation if the contact 29 is closed. In the other position, it breaks the circuit of the secondary headlights and brings into operation the main driving headlights 32.

The transistors 55 and 58 are so adjusted as to trigger, respectively, when the value of the resistance of the cell 1 is equal to about 1000 ohms in the case of the first and to 2 megohms in the case of the second.

It will be seen that the triggering of the transistor 55 brings about the operation of the sidelights 36. This takes place automatically at sunset, the resistance of the cell 1 being lower than 1000 ohms only when it is strongly illuminated. On the other hand, in order that the resistance may reach 2 megohms, darkness must be almost complete, for example as in the open country. At this instant, the main headlghts are automatically switched on, but if the cell 1 is subjected to a light such as, for example, that of an oncoming vehicle, the resistance falls below the triggering threshold of the transistor 58, the coil 62 ceases to act on the contact 63, the main driving headlights are switched off and the secondary headlights are switched on.

It has been observed that the threshold of 2 megohms can also be reached in the absence of artificial lighting, for example under the effect of moonlight. However, experience has shown that under these conditions the lighting by means of the secondary headilghts is quite sufficient.

The assemblies 52, 53 and 54 may be housed in a common casing. The latter two have no separate manual control. Only a main switch such as the main switch 51 can be used to bring the apparatus into or out of operation.

I claim:
1. Apparatus for the automatic control of the headligths of a vehicle having main headlights and secondary headlights comprising a photosensitive resistor and a bias resistor connected in series between the poles of a direct-current source, a number of transistors whose bases are connected to the point of contact between the said resistors so that their voltage varies in accordance with the intensity of the lighting to which the photosensitive resistor is exposed, the said transistors being so adjusted that they are each triggered at a different value of the said voltage, a number of relays each controlled by means of one of the said transistors, one of the said relays rendering the sideligths of the vehicle operative when the intensity of the light on the photosensitive resistor falls below a first threshold, the second relay rendering the secondary headlights operative when the intensity of the light on the photosensitive resistor decreases below a second threshold lower than the first, and the third relay rendering the main driving headlights of the vehicle operative when the intensity of the light on the photosensitive resistor falls below a third threshold lower than the second.

2. Apparatus according to claim 1, comprising between the second transistor and the second relay an amplifying circuit formed of a number of transistors which are triggered when the intensity of the light reaches the second threshold and a time delay element consisting of a capacitor and a resistor in parallel and delaying the de-energisation of the second relay when the intensity of the light falls below the second threshold.

References Cited by the Examiner
UNITED STATES PATENTS

| | | | |
|---|---|---|---|
| 2,944,188 | 7/1960 | Lohr et al. | 315—83 |
| 2,962,628 | 11/1960 | McIlvaine | 315—83 |
| 3,037,144 | 5/1962 | La Mantia | 315—83 |

OTHER REFERENCES

Motorola Zener Diode/Rectifier Handbook, 1961, pp. 93 and 94.

JAMES W. LAWRENCE, *Primary Examiner.*

R. JUDD, *Assistant Examiner.*